(12) United States Patent
Cheng et al.

(10) Patent No.: US 7,125,184 B2
(45) Date of Patent: Oct. 24, 2006

(54) PRINTER WITH REPLACEABLE MODULES

(75) Inventors: Shih-Wei Cheng, Kao Hsiung (TW);
Yu-Feng Huang, Chia I (TW);
Hsin-Chih Chen, Tai Nan (TW);
Hsi-Pin Li, Hsin Chu (TW)

(73) Assignee: Lite-On Technology Corp., Taipei (TW)

( * ) Notice: Subject to any disclaimer, the term of this patent is extended or adjusted under 35 U.S.C. 154(b) by 104 days.

(21) Appl. No.: 10/859,178

(22) Filed: Jun. 3, 2004

(65) Prior Publication Data

US 2005/0271450 A1    Dec. 8, 2005

(51) Int. Cl.
*B41J 29/02*    (2006.01)
(52) U.S. Cl. ............................ 400/693; 400/692
(58) Field of Classification Search ........ 400/691–693, 400/88
See application file for complete search history.

(56) References Cited

U.S. PATENT DOCUMENTS

| | | | | |
|---|---|---|---|---|
| 5,095,449 A | * | 3/1992 | Kurtin | .................. 358/1.11 |
| 5,308,173 A | * | 5/1994 | Amano et al. | ................. 400/29 |
| 5,707,162 A | * | 1/1998 | Kasai et al. | ................. 400/692 |
| 5,988,898 A | * | 11/1999 | Ackley | .................. 400/61 |
| 6,030,133 A | * | 2/2000 | Endo | .................. 400/82 |
| 6,618,068 B1 | * | 9/2003 | Ishikawa | .................. 347/215 |
| 6,944,689 B1 | * | 9/2005 | Billington et al. | ............. 710/62 |
| 6,963,936 B1 | * | 11/2005 | Billington et al. | ............. 710/62 |

* cited by examiner

*Primary Examiner*—Minh Chau
(74) *Attorney, Agent, or Firm*—Birch Stewart Kolasch & Birch, LLP

(57) ABSTRACT

A printer with replaceable modules has a printer and an electronic expansion device. The printer has an operating panel mounted on a top thereof, a connecting mechanism formed on a bottom thereof, and at least one connector mounted on the bottom thereof. The electronic expansion device has a mating connecting mechanism removably assembled on the bottom of the printer, and a mating connector connecting with the connector on the bottom of the printer. The printer has an identification interface electrically connecting with the connector for identifying the electronic expansion device. The electronic expansion device can be a scanner, an entertainment device, a data-access device, or a battery.

14 Claims, 7 Drawing Sheets

PRINTER WITH REPLACEABLE MODULES

BACKGROUND OF THE INVENTION

1. Field of the Invention

The present invention relates to a printer with replaceable modules, and especially to a printer that combines different function-electronic expansion devices.

2. Description of Prior Art

Inkjet printers are now very popular as an information output device of computer, and have an advantage of quietness and the automatic capability of color printing. The common structure of an inkjet printer comprises a paper inlet, a paper outlet, a paper feed assembly, a nozzle and an ink cartridge. However, its function is still confined to the printing of information or pictures, and it remains peripheral equipment of computer for user or R&D (research and develop) people. The printer must rely on a computer to access information, and this is a limitation for further development of an inkjet printer.

Analysis of consumer demand and market information shows that the market for inkjet printers seems to be reaching a bottleneck and even declining. Changing the direction of inkjet printer development thus is worthwhile.

By studying the disadvantage of the prior art and possible sustainable development directions, the inventor has invented this device. By adding novel functions, combining video recording products, digital camera or audio-visual products, the invention is more reasonable, flexible, effective and powerful, and probably will stimulate the consumer market.

SUMMARY OF THE INVENTION

An object of the present invention is to provide a printer with replaceable modules. It mostly provides a printer that can joint with different electronic expansion devices with replaceable modules, in order to expand the functions of the printer.

Another object of the present invention is to provide an electronic expansion device with replaceable modules and applied to a printer, in order to expand the functions of a printer.

To achieve the above objects, the present invention according to one aspect thereof provides a printer with replaceable modules comprising a printer and an electronic expansion device. The printer has an operating panel mounted on a top thereof, a connecting mechanism formed on a bottom thereof, and at least one connector mounted on the bottom thereof. The electronic expansion device has a mating connecting mechanism which is removably assembled on the bottom of the printer, and a mating connector which is connecting with the connector on the bottom of the printer. The printer has an identification interface which is electrically connecting with the connector for identifying the electronic expansion device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present invention, and in which.

DETAILED DESCRIPTION OF THE INVENTION

Figure 1:
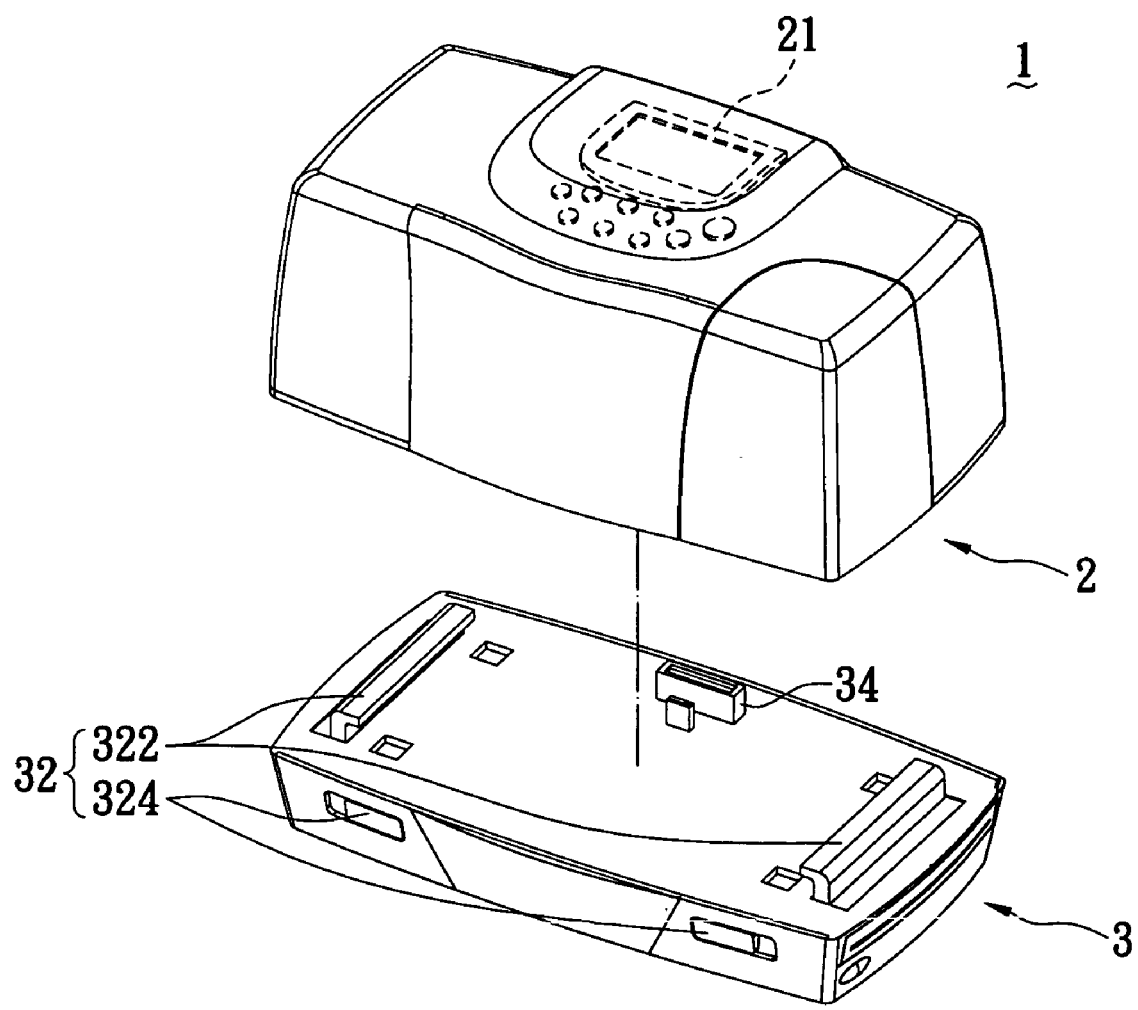
FIG. 1 is a perspective view illustrating a printer with replaceable modules of the present invention.
Figure 2:
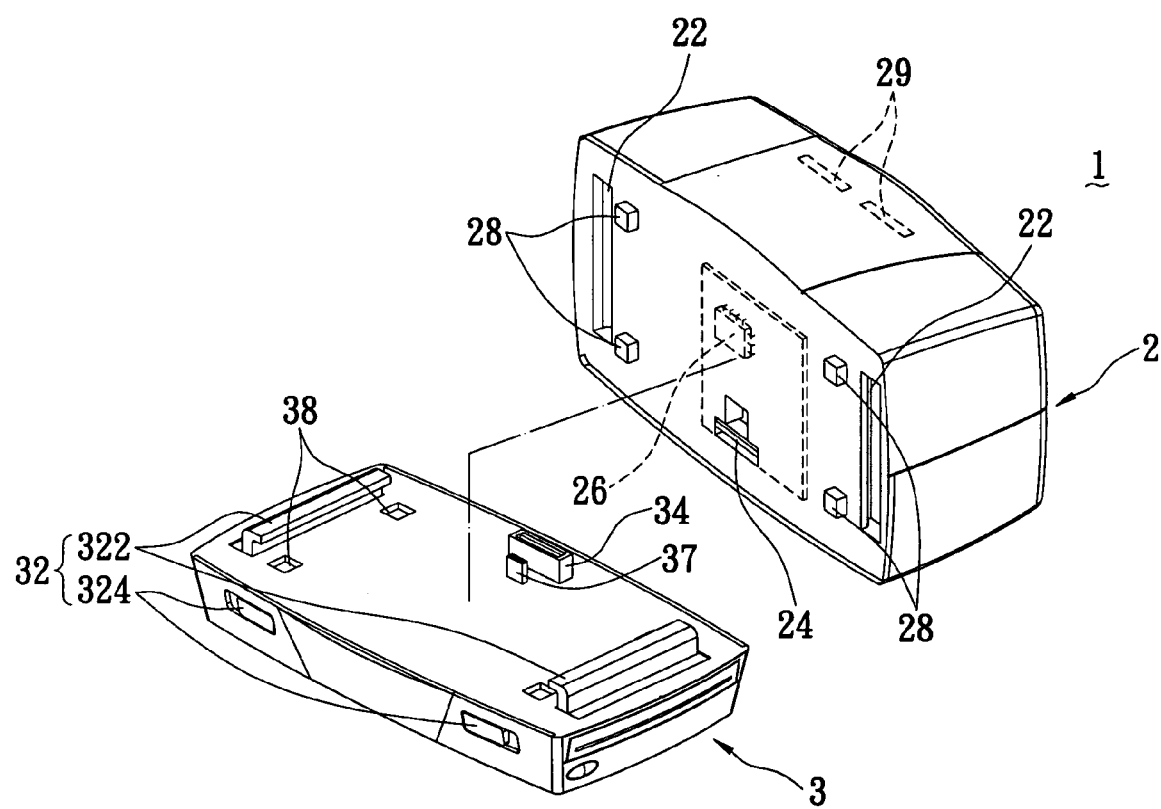
FIG. 2 is another perspective view illustrating the printer with replaceable modules of the present invention.

FIG. 1 and FIG. 2 are perspective views illustrating a printer with replaceable modules 1 according to the present invention. The printer with replaceable modules 1 comprises a printer 2 and a removable electronic expansion device 3 assembled on a bottom of the printer 2. The printer 2 has an operating panel 21 that is mounted on a top thereof, a connecting mechanism that is formed on the bottom thereof, and at least one connector 24 that is mounted on the bottom thereof. The electronic expansion device 3 has a mating connecting mechanism 32 that is arranged on a top thereof, and a mating connector 34 for connecting with the connector 24 of the printer 2. The printer 2 has an identification interface 26 which is electrically connected to the connector 24 for identifying the electronic expansion device 3. The identification interface 26 can be a firmware system which is formed on a PCB (not labeled). The connector 24 is positioned in a holding slot (not labeled) formed on the bottom of the printer 2, and the connector 24 is not exposed out a bottom surface of the printer 2. The mating connector 34 of the electronic expansion device 3 extrudes from a top surface thereof. Each of the connector 24 and the mating connector 34 comprises signal terminals and terminals of power source, respectively.

In this embodiment, the connecting mechanism of the printer 2 comprises a pair of grooves 22 concaved from the bottom thereof, and each groove 22 has an approximately L-shaped section. The mating connection mechanism 32 of the electronic expansion device 3 comprises a pair of L-shaped block tenons 322; each of the block tenons 322 is moveably built-in the electronic expansion device 3 and protruding from the top thereof. A pair of slide locks 324 are moveably positioned on a sidewall of the electronic expansion device 3 for controlling the block tenons 322. However, the connecting mechanism between the printer 2 and the electronic expansion device 3 is not limited to the structure as above described; any removable assembly manner can be used. For example, the printer 2 can use a draw-out groove to connect with the electronic expansion device 3 in a push-pull manner. The printer 2 and the electronic expansion device 3 also can be assembled together by using a slide groove or in an engaging manner.

Considering a situation where the printer 2 works independently, the printer 2 comprises a plurality of protruding posts 28 which are formed on the bottom thereof for supporting and damping. At the same time, the electronic expansion device 3 includes a plurality of acceptable grooves 38 which are respectively concaved from the top thereof with respect to the protruding posts 28, so as to accept the protruding posts 28 when they are assembled.

The printer 2 can be a photo printer; it has smaller size and occupies less space than a conventional printer, and it provides a compact portable output device for a digital camera because the largest printing size is 4×6 or 5×7. In other aspect, it provides output equipment for digital cameras and multi input/output ways for user. Further, at least one memory card access device 29 can be installed in the front of the printer 2. With the memory card access device, image files which are stored in a memory card can be printed directly. Exchanging data between the printer and the digital camera, or the memory card of a digital camera alone also becomes very convenient. Data can also exchange between the electronic expansion device 3 and the digital camera, or the memory card of digital camera alone.

The operating panel 21 of the printer 2 comprises a liquid crystal display 212, an image source choosing key and a document access control key. The liquid crystal display 212 is used to display images and status of the electronic expansion device 3. The image source choosing key is used to select the source of image files. The document access control key is used to access documents. However, the above operating functions also can be implemented with an LCD touch screen, and is not limited to mechanical keys.

Figure 3:
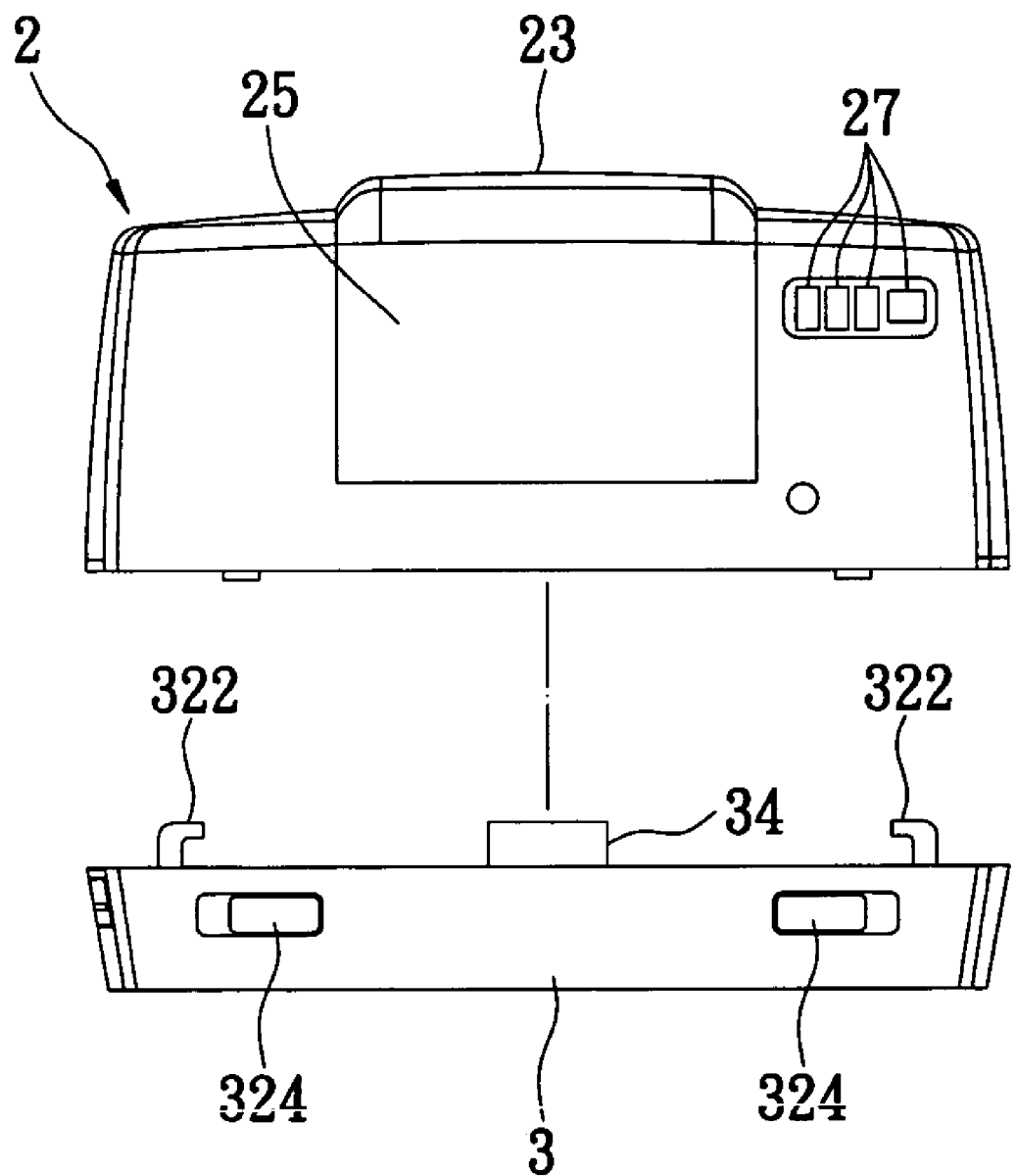
FIG. 3 is a back view illustrating the printer with replaceable modules of the present invention.

Referring to FIG. 3, the printer 2 further comprises at least one USB (Universal Serial Bus) connector 27 positioned at outside thereof for connecting another electronic expansion device 3. The electronic expansion device 3 further comprises at least one USB connector 37 formed on its top or side (referring to FIG. 2). The printer 2 can thus connect with two or above electronic expansion devices 3 at the same time. By using a communication cable to connect the USB connector 37 of another electronic expansion device 3 with the connector 27 of the printer 2, such as connecting a scanner and a CD-RW (Compact Disk-Read/Writer) driver.

Figure 4:
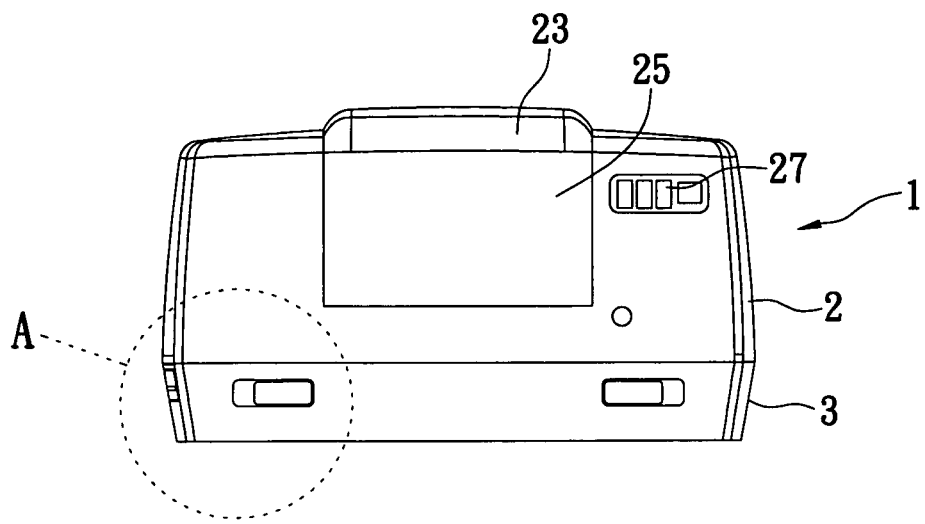
FIG. 4 is a back view illustrating the printer with replaceable modules of the present invention when it is in an assembled state.
Figure 4A:
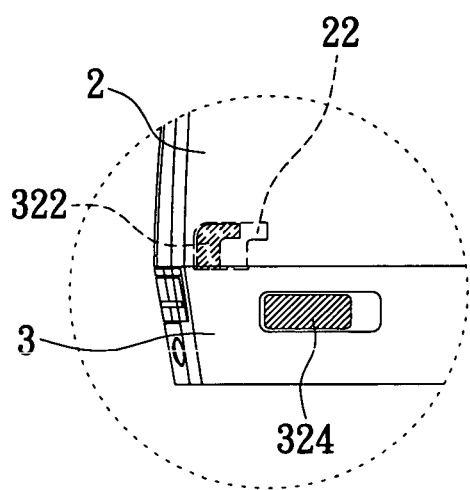
FIG. 4A is an enlarged partial view illustrating a connecting mechanism shown in FIG. 4 before assembly.
Figure 4B:
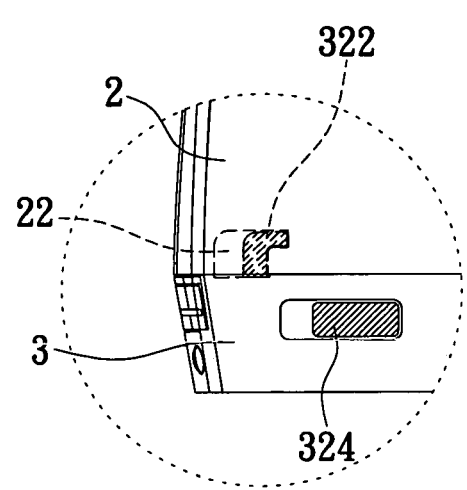
FIG. 4B is an enlarged partial view illustrating a connecting mechanism shown in FIG. 4 after assembly.

Referring to FIG. 4, FIG. 4A and FIG. 4B, an assembled back view of the printer with replaceable modules of the present invention, and an enlarged partial view of a connecting mechanism in FIG. 4 are illustrated. The block tenon 322 is moveably positioned in the electronic expansion device 3 and protruding from the top of the electronic expansion device 3. The slide locks 324 drives the block tenons 322 into the grooves 22 of the printer 2 for fastening the printer 2 with the electronic expansion device 3, or drives the block tenons 322 out of the grooves 22 for separating them.

Figure 5:
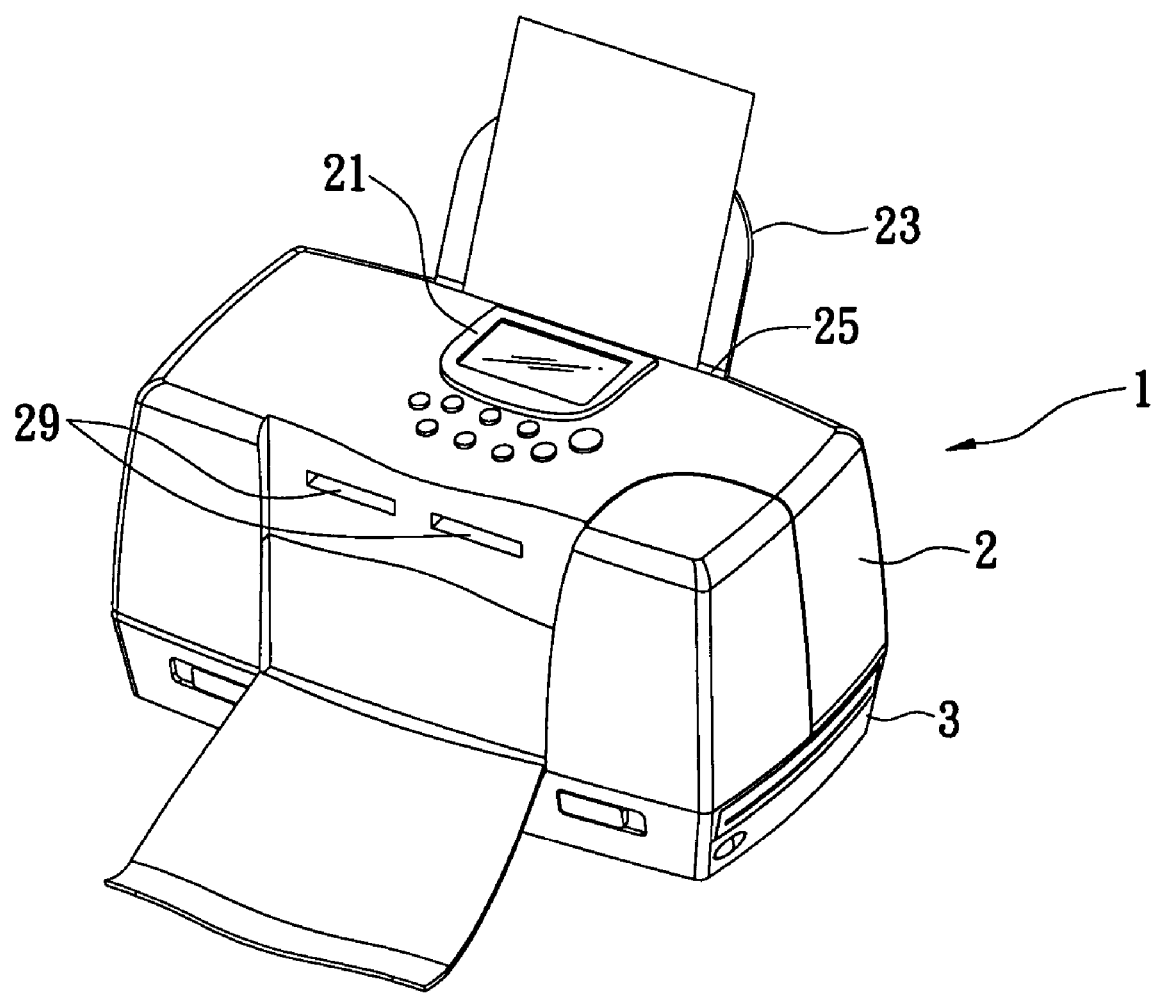
FIG. 5 illustrates a printer with replaceable modules when it is assembled and used in accordance with a first embodiment of the present invention.

Reference is further made to FIG. 5, which illustrates the working status of the printer with replaceable modules. The printer 2 further comprises a moveable top cover 23 and a side cover 25 which is connected under the top cover 23. The side cover 25 has one end rotatably connecting to the back-wall of the printer 2. The top cover 23 protects the operating panel when it is covered, and, cooperating with the side cover 25, the top cover 23 can be used as a paper feeder when it is opened. Another cover (not labeled) is positioned in the front of the printer 2, which is closed in a non-printing state for protecting the memory card access device 29 and forming a beautiful, streamlined outline.

Figure 6:
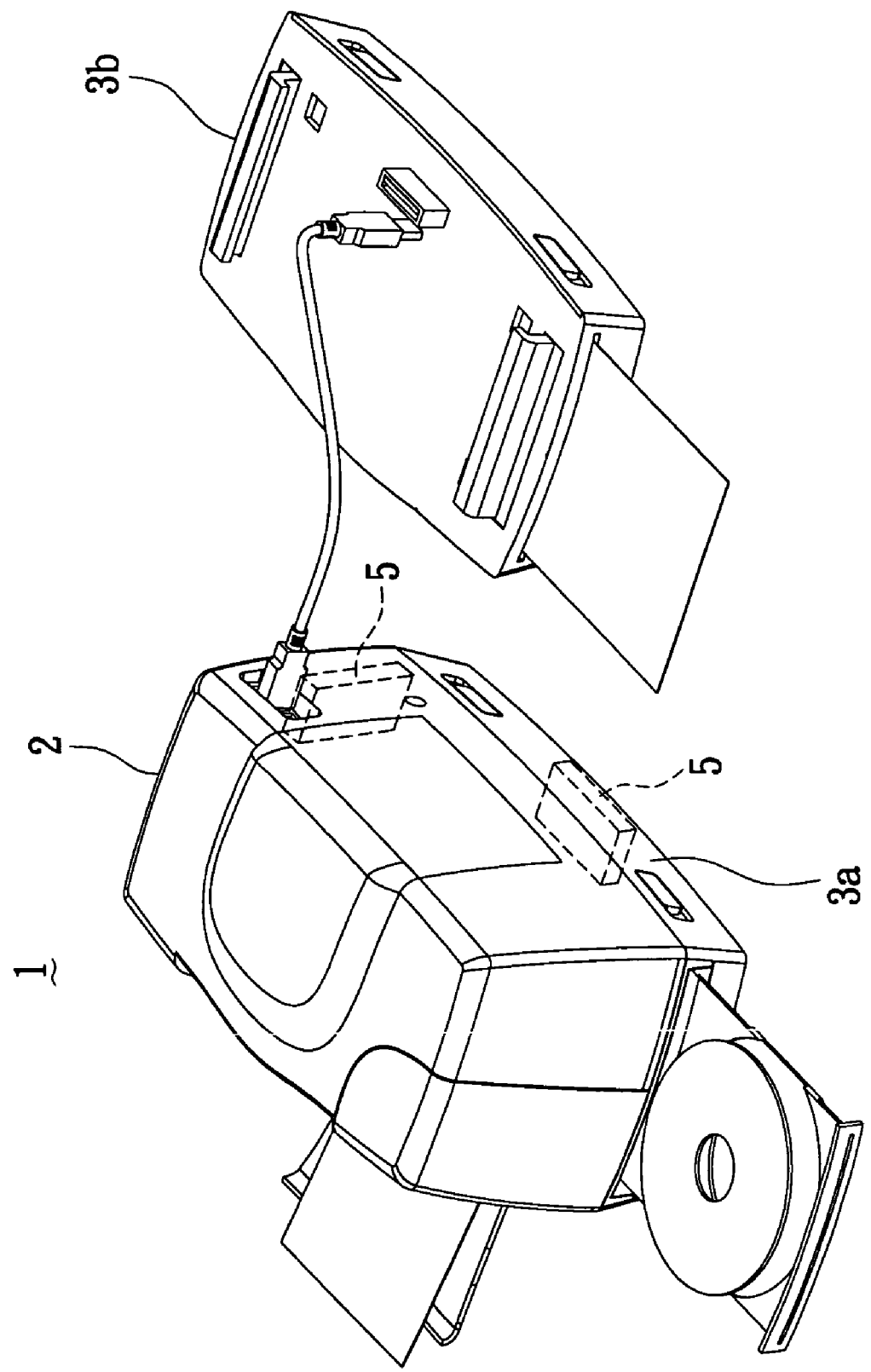
FIG. 6 illustrates a printer with replaceable modules when it is assembled and used in accordance with a second embodiment of the present invention.
Figure 7:
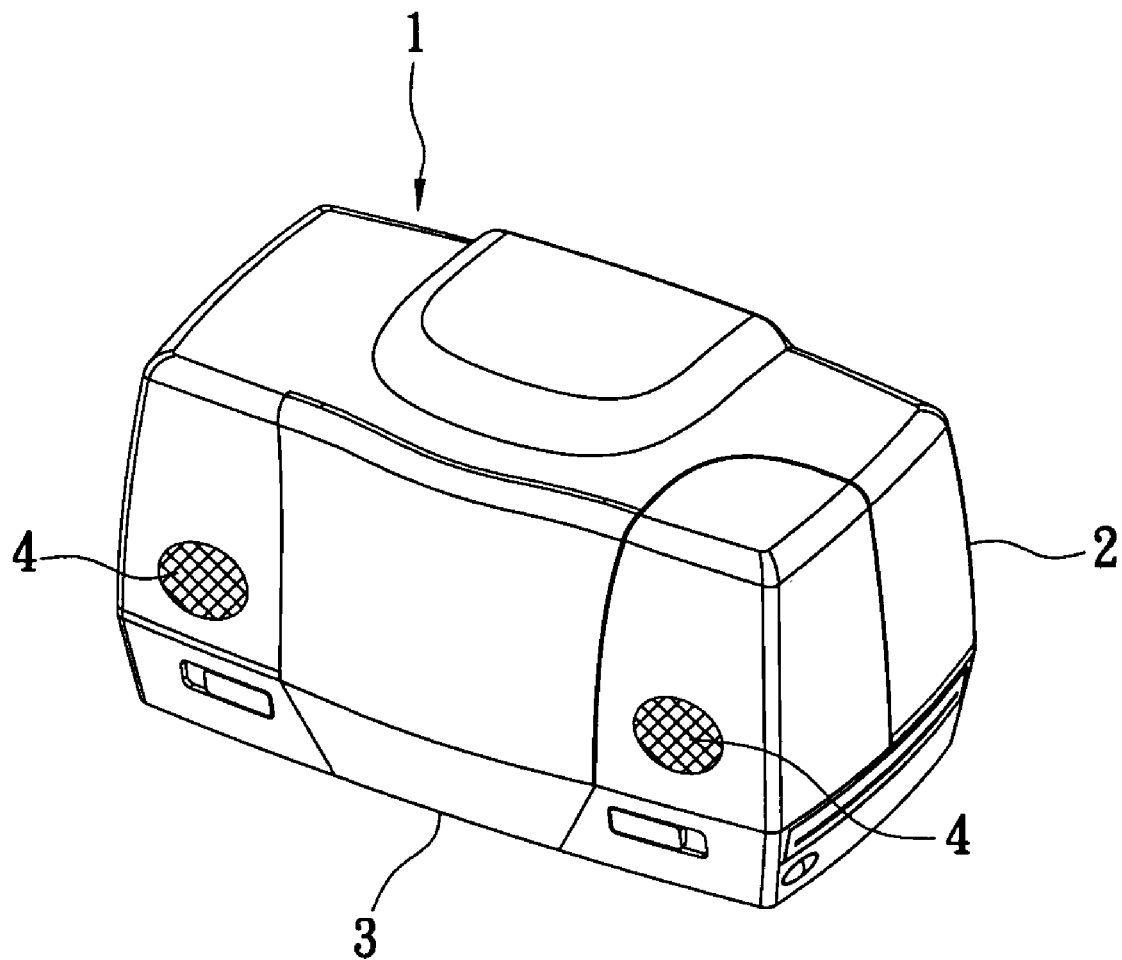
FIG. 7 illustrates a printer with replaceable modules when it is assembled and used in accordance with a third embodiment of the present invention.

FIG. 6 and FIG. 7 show other use states of the printer with replaceable modules. The electronic expansion device is a data access device 3a, for example, a hard disk driver or a CD-ROM driver, and one can access data via the electronic expansion device, i.e. the data access device, therefore the printer can access image files without a computer system. The printer with replaceable modules can also connect to a scanner, so that the image can be displayed on LCD screen on the operating panel after scanning, and the user can choose to save or print.

The printer with replaceable modules 1 can be installed with a speaker 4 additionally in the printer 2 or the electronic expansion device 3; in this way, the printer with replaceable modules has an entertainment function. The electronic expansion device as an entertainment device further comprises a memory unit and a video/audio playback unit such as, a MP3 player for playing music or playing video/audio program. Because the hard disk driver or a read-writable CD-ROM driver consumes high electric power, a rechargeable battery 5 is installed in the printer 2 or the electronic expansion device 3. Alternatively, the electronic expansion device 3 can be a rechargeable battery; the rechargeable battery improves mobility of the printer.

Thereby, the printer with replaceable modules of the present invention has advantages as followed:

1. The printer has continuous developing directions with multi-functions to meet various needs, for life entertainments, external scanning. It cannot only different from the conventional printer and the traditional image in user, but also stimulate the consumer market.

2. The printer is full of portability and fitted for more occasions, especially when the present invention applied with a small photo-printer.

3. The printer has independence without accessing data through computer, so that the user use more conveniently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A printer with replaceable modules, comprising:
   a printer having an operating panel mounted on a top thereof, a connecting mechanism formed on a bottom thereof, and at least one connector mounted on the bottom thereof; and
   an electronic expansion device having a mating connecting mechanism removably assembled on the bottom of the printer, and a mating connector connecting with the connector on the bottom of the printer; and
   a moveable top cover and a side cover being set under the top cover, the side cover having one end for rotatably connecting to a back-wall of the printer; thereby the top cover protects the operating panel when closed, and top cover cooperates with the side cover to act as a paper feeder;
   wherein the printer has an identification interface electrically connecting with the connector for identifying the electronic expansion device.

2. The printer with replaceable modules as described in claim 1, wherein the printer further comprises at least one USB (Universal Serial Bus) connector positioned at an outside thereof, and wherein the electronic expansion device further comprises at least one USB connector, whereby the printer connects with two electronic expansion devices.

3. The printer with replaceable modules as described in claim 1, wherein the printer comprises at least one memory card access device.

4. The printer with replaceable modules as described in claim 1, wherein the connecting mechanism comprises a plurality of grooves formed in the bottom thereof with each groove having an approximately L-shaped section; and wherein the mating connection mechanism of the electronic expansion device comprises a pair of approximately L-shaped block tenons, each of the block tenons is moveably built into the electronic expansion device and protrudes from a top thereof, and a plurality of slide locks are moveably positioned at a side wall thereof for controlling the block tenons.

5. The printer with replaceable modules as described in claim 4, wherein the printer has a plurality of protruding posts formed on the bottom thereof, and wherein the electronic expansion device comprises a plurality of acceptable grooves with respect to the protruding posts arranged on a top thereof.

6. The printer with replaceable modules as described in claim 1, wherein the operating panel comprises a liquid crystal display.

7. The printer with replaceable modules as described in claim 1, wherein the printer comprises a speaker, and wherein the electronic expansion device is an entertainment device having a mating connecting mechanism, a memory unit, and a video/audio playback unit.

8. The printer with replaceable modules as described in claim 1, wherein the electronic expansion device is a data access device and comprises at least one mating connecting mechanism.

9. The printer with replaceable modules as described in claim 1, wherein the electronic expansion device is a scanner and comprises at least one mating connecting mechanism.

10. The printer with replaceable modules as described in claim 1, further comprising a rechargeable battery mounted therein.

11. A printer, comprising:

an operating panel mounted on a top thereof;

a connecting mechanism formed on a bottom thereof for connecting with an electronic expansion device;

a connector mounted on the bottom thereof; and an identification interface electrically connecting with the connector for identifying the electronic expansion device; and a moveable top cover and a side cover being set under the top cover, wherein the side cover has one end rotatably connecting to a back-wall of the printer, thereby the top cover protects the operating panel when closed, and the top cover cooperates with the side cover to act as a paper feeder.

12. The printer as described in claim 11, further comprising at least one USB (Universal Serial Bus) connector positioned at an outside thereof.

13. The printer as described in claim 11, further comprising a memory card access device mounted therein.

14. The printer as described in claim 11, wherein the connecting mechanism comprises a plurality of grooves formed on the bottom thereof for engaging with a mating connecting mechanism of the electronic expansion device, and each groove having an approximately L-shaped section.

* * * * *